2,856,439
Patented Oct. 14, 1958

2,856,439
PROCESS FOR THE PRODUCTION OF FLUORINATED POLYMERS

Hans-Helmut Frey, Frankfurt am Main, Germany, assignor to Farbwerke Hoechst Aktiengesellschaft vormals Meister Lucius & Brüning, Frankfurt am Main, Germany No Drawing. Application September 9, 1954
Serial No. 455,071

Claims priority, application Germany September 17, 1953

5 Claims. (Cl. 260—653)

Organic chemicals and materials, which consist only or mainly of carbon and fluorine or carbon, fluorine and chlorine, are becoming increasingly important. Among these materials, representatives of the most different molecular weights are known with all intermediate stages from gaseous to liquid, oily, waxy and solid states of synthetic materials.

Different kinds of methods are known, whereby such products may be obtained from the polymerization reaction of chlorotrifluoroethylene.

For example, one may obtain relatively low molecular products from the polymerization of chlorotrifluoroethylene with polymerization initiators giving free radicals in the liquid phase and in the presence of halogenated solvents as carbon tetrachloride or chloroform. A disadvantage of this method is that in order to obtain oils and waxes, large amounts of the halogenated solvents, for example, a tenfold excess over the monomer, are necessary. Large amounts of solvents must be worked up to isolate the desired product.

The analysis of the chlorofluorocarbon oils shows that the solvent is included in the polymer. Accordingly, this is a typical telomerization.

Instead of the above named halogenated solvents, other organic compounds have been proposed as chain transfer agents, since this polymerization can be carried out in theory with all saturated, non-polymerizable organic compounds, thus including the chain transfer group as an end group into the polymer and causing more or less far reaching changes in the chemical and physical properties of the chlorofluorocarbon oil depending on the chain length of the molecule. Often this may be very desirable, since one may undertake further chemical reactions at the end groups, changing the character of the compound further. Often, however, the inclusion of such substances is quite undesirable, if one wishes to attain a continuously halogenated, regularly constituted molecular chain without disturbing end groups, since only then do the outstanding chemical as well as physical properties of the fluoro- and chlorofluoro compounds achieve their real importance.

From another process, one obtains liquid products by polymerization in the gas phase, charging halogens or materials splitting off halogen as catalysts. The yields in this process are lowered by the competing reaction, the halogenation of the monomer.

In a further process, one obtains liquid products also from a gas polymerization, if one uses di-t-butyl peroxide or 2.2-bis(t-butyl peroxy)-butane as catalyst and works in the presence of an inert gas. Working with this known process, it is found, that the conversions are low and that an undesirable, broad distribution of the molecular weights of the polymerization product is obtained.

For instance, the conversion of the fractions B. P. 100–230° C. at 5 mm. Hg which are of importance for all fields of application, especially for the use of plasticizers, is 1–3 parts by weight per hour, corresponding to a yield of about 50%, calculated on the monomer charged.

Now it was found, that one may prepare liquid, oily or waxy, fluorine containing polymers or copolymers by subjecting fluoro- and/or chlorofluoroolefins to polymerization under conditions in themselves known in the presence of peroxides and olefins, which are completely or partially substituted with chlorine. (In the known processes, for instance, pressures from atmospheric pressure to one atmosphere (gauge) and temperatures from between 100° C. and 400° C. are used.) The products mentioned are obtained thereby in considerably larger yields and conversions with a narrower molecular weight distribution (which can be recognized from the quantity of the single fractions with distinct melting or boiling points) than from known processes. Thus, according to the present process, the conversion to the fraction B. P. 100–230° C. at 5 mm. Hg is 15–30 parts by weight per hour, corresponding to a yield of 75% calculated on the monomer used.

In the present process, mixtures of peroxides, for instance, of 50–99%, particularly 80–99%, of dialkylperoxides such as di-t-butyl peroxide or 2.2-bis-(t-butylperoxy)-butane etc., of 1–50%, particularly 1–20%, of alkyl hydroperoxides, such as cumene hydroperoxide, t-butyl hydroperoxide etc. and/or of 1–50%, particularly 1–20%, of petoperoxides or peracid esters, such as methyl amyl ketoperoxide, t-butyl perbenzoate, have also proved useful, of which at least one is ineffective alone in the reaction described in this invention (see below). From the outset, it could not be expected, that such mixtures would lead to an advantageous technical process.

In the present process, in the presence of olefins and peroxides or peroxide mixtures completely or partially substituted by chlorine, considerably smaller amounts of peroxides, for instance only half the amounts, are required than in the known processes described above.

Although chlorotrifluoroethylene represents the halogenated olefin preferably used as monomer in the present invention, other halogenated fluoro- and/or chlorofluoroolefins, such as tetrafluoroethylene, sym. and asym. dichlorodifluoroethylenes, perhalopropenes, perhalobutadienes, etc. may be used according to this invention.

Olefins, completely or partially substituted by chlorine, which are to be added to the reaction mixture may be: tetrachloroethylene, trichloroethylene, completely or partially chlorine substituted propenes, butenes, etc. The said substances having a similar effect, they can be mixed with one another in any desired proportion.

Effective peroxides are: dialkyl peroxides, such as di-t-butyl peroxide, 2.2-bis-(t-butylperoxy)-butane, etc.

Used alone, the following peroxides are ineffective: alkyl hydroperoxides, such as t-butyl hydroperoxide, cumene hydroperoxide, etc.; ketoperoxides, such as methyl amyl ketoperoxyde, etc.; peracid esters, such as t-butyl perbenzoate, etc.

The following table shows in which way the effective and ineffective peroxides and the olefines substituted by chlorine may be present in the reaction mixture:

| | parts by weight | preferably used, parts by weight |
|---|---|---|
| effective peroxide | 10–90 | 40–80. |
| ineffective peroxide | 1 (if desired up to 20). | 1 (up to 10). |
| olefins substituted by chlorine | 89–9 | 59–19. |

It is also possible to augment the proportion of the peroxide, ineffective when used alone, the proportion of the chlorine substituted olefins decreasing pari passu with the increasing proportion of the peroxide, ineffective when used alone (see table).

Mixtures of di-t-butyl peroxide and cumene hydroperoxide and/or methyl amyl ketoperoxide have proved themselves particularly effective. Acyl peroxides are practically ineffective alone and in the mixtures mentioned.

In the present process, the addition of acids, such as acetic acid, oxalic acid, reducing agents, such as formic acid, sulfinic acids, and salts of heavy metals, such as iron or copper salts, to the peroxide or its solution is advantageous, as is also quite usual in polymerization reactions. It is recommended to introduce these additives separate from the peroxide into the reaction zone.

The temperature may be varied over large ranges, corresponding to the desired distribution of molecular weight. One can work at temperatures from about 130 to about 400° C. suitably, however, from about 170 to 300° C., forming longer chain molecules at the lower temperatures than at the higher temperatures.

The process can be performed at atmospheric pressure and also at higher pressures up to 100 atmospheres (gauge) preferably to 20 atmospheres (gauge), taking care, however, that the monomer remains gaseous, by working above the critical temperature of the monomer.

Furthermore, the process can be carried out in autoclave. One works advantageously in a flow tube heated to the necessary temperature applying throughputs of 10–1000 liters per hour with a tube diameter of 40 mm., for example, so that the contact time is short, for insance 1–10 minutes, advantageously 2–5 minutes. The present process can also be carried out in a recycle system.

In the described process, low molecular weight polymers having a polymerization degree of 1–10, perferably of 5–8 are obtained without the production of undesirable telomers with attached non-homologous end groups, which would change markedly the character of the desired fluoro- and/or chlorofluoro compounds.

The polymers obtained can be applied, for example, as plasticizers for fluoroplastics, lubricants, dielectric materials, etc. One fluorinates them advantageously with known fluorinating agents, such as $CoF_3$, $ClF_3$, $AgF_2$, $MnF_2$, etc.

The polymerization may be performed in the following manner: The solution of peroxide is added before the flow tube (1.7 m. long, 40 mm. I. D.) dropwise at a constant rate into the blower actuated gas recycle system, which is at the pressure of a gas holder of about 10–about 100 mm. Hg gauge and to which gaseous chlorotrifluoroethylene is continuously added. The vaporized or atomized solution is carried by the gas stream, if necessary through a connected preheater into the flow tube which has been heated to the necessary temperature. The flow tube may be arranged horizontally or vertically. The polymer formed in the flow tube is continually drawn off as a liquid at the gas outlet. Fogs formed thereby, which can be condensed only with difficulty, may be condensed easily with a hilgh tension apparatus, for example, a Cottrell-Mueller device. Unreacted monomer is recycled further by the pump continuously replenishing the monomer consumed from the gas holder.

Example 1

During a period of 11½ hours, 400 parts by weight of a 50% solution of di-t-butyl peroxide in tetrachloroethylene are added dropwise to the chlorotrifluoroethylene gas recycle system, using 280 parts by weight of chlorotrifluoroethylene. The chlorotrifluoroethylene is recycled at a rate of 250 liters per hour. The vertical flow tube is kept at a temperature of 170°. The gas recycle system is kept at a slight excess pressure of 0.1 atm. gauge, to prevent entrance of air.

663 parts by weight of a dark yellow liquid are obtained, of which the last fractions accumulated as a fog are precipitated by aid of a high tension apparatus.

From a distillation at atmospheric pressure, 454 parts by weight chlorotrifluoroethylene, tetrachloroethylene, the decomposition product of the peroxide and low boiling polymers are obtained up to a temperature of 130° C.

The main fraction of the accumulated polymer with a boiling point of 100–250° C. at a vacuum of 5 mm. is 151 parts by weight, corresponding to a yield of 54% calculated from the chlorotrifluoroethylene charged. The conversion to the fraction B. P.: 100–250° C. at 5 mm. Hg is 13 parts per weight per hour. 11 parts by weight of a dark brown resin are accumulated as a nondistillable residue.

The fraction B. P.: 100–250° C. at 5 mm. Hg gives a water clear, odorless, thermally and chemically stable polymer, after fluorination with cobalt trifluoride.

Example 2

Within a period of 40 hours, a total of 900 parts by weight of a 50% solution of di-t-butyl peroxide and 5% cumene hydroperoxide (40%) in tetrachloroethylene are added dropwise to the chlorotrifluoroethylene gas recycle system simultaneously with 200 parts by weight formic acid (98–100%). A total of 1200 parts by weight of chlorotrifluoroethylene are added from the gas holder. The temperature in the flow tube is 200° C. The gas is recycled at a rate of 300 liters per hour.

A total of 2115 parts by weight of a yellow brown liquid is obtained. This is subjected to steam distillation, obtaining 298 parts by weight of a water insoluble layer which consists mainly of tetrachloroethylene.

The residue from the steam distillation is washed with water, 5% sodium carbonate solution, 5% sodium hydroxide solution in this order and finally again with water. 178 parts by weight are then distilled up to 130° C. under atmospheric pressure and further 42 parts by weight in a vacuum of 5 mm. up to 100° C. 885 parts by weight of a residue of oily to waxy consistency remain; that is, a yield of 74% calculated on the basis of the chlorotrifluoroethylene charged. The conversion to this residue, which corresponds to a fraction of B. P. 100–250° C. at 5 mm. Hg, is 22 parts per weight per hour. This fraction of B. P.: 100–250° C. at 5 mm. Hg gives a colorless, tasteless, thermally and chemically stable polymer after fluorination with cobalt trifluoride.

Example 3

In a further preparation, 100 parts by weight of a solution of 50% di-t-butyl peroxide and 5% cumene hydroperoxide (40%) in tetrachloroethylene are added dropwise within a period of 7½ hours into the chlorotrifluoroethylene at a gas recycle rate of 300 liters per hour, simultaneous with 75 parts by weight of anhydrous formic acid. The temperature in the flow tube is kept at 200° C. 260 parts by weight of chlorotrifluoroethylene are supplied from the gas holder.

One obtains 412 parts by weight of a yellow brown liquid. 112 parts by weight are distilled off at atmospheric pressure up to 130° C. and further 46 parts by weight up to 100° C. under a vacuum of 5 mm.

More than 200 parts by weight of a highly viscous oil accumulate as a residue; that is a yield of 76% calculated from the chlorotrifluoroethylene charged. The conversion to this oil, which corresponds to a fraction with a B. P.: 100–250° C. at 5 mm. Hg, is 27 parts by weight per hour.

I claim:

1. A process for carrying out a chain transfer reaction which comprises reacting a polymerizable perfluorohaloolefin having not more than four carbon atoms per molecule in the vapor phase, at a temperature between about 130° C. and 400° C. in the presence of a dialkyl peroxide in admixture with a peroxide selected from the group consisting of alkyl hydroperoxides, ketoperoxides, and peracid esters, and a non-polymerizable chlorinated aliphatic olefin having at least three chlorine atoms attached to the carbon atoms of an olefinic double bond.

2. A process for carrying out a chain transfer reaction which comprises reacting a polymerizable perfluorohaloethylene in the vapor phase, at a temperature between about 130° C. and about 400° C., in the presence of a dialkyl peroxide in admixture with a peroxide selected from the group consisting of alkyl hydroperoxides, ketoperoxides, and peracid esters, and a non-polymerizable chlorinated ethylene having at least three chlorine atoms.

3. A process for carrying out a chain transfer reaction which comprises reacting chlorotrifluoroethylene in the vapor phase, at a temperature between about 130° C. and about 400° C., in the presence of a dialkyl peroxide in admixture with a peroxide selected from the group consisting of alkyl hydroperoxides, ketoperoxides, and peracid esters, and a non-polymerizable chlorinated ethylene containing at least three chlorine atoms.

4. A process for carrying out a chain transfer reaction which comprises reacting tetrafluoroethylene in the vapor phase, at a temperature between about 130° C. and about 400° C., in the presence of a dialkyl peroxide in admixture with a peroxide selected from the group consisting of alkyl hydroperoxides, ketoperoxides, and peracid esters, and a non-polymerizable chlorinated ethylene containing at least three chlorine atoms.

5. A process for carrying out a chain transfer reaction which comprises reacting a polymerizable perfluorohaloethylene in the vapor phase, at a temperature between about 130° C. and about 400° C., in the presence of di-t-butyl peroxide in admixture with cumene hydroperoxide and tetrachloroethylene.

References Cited in the file of this patent

UNITED STATES PATENTS

| | | |
|---|---|---|
| 2,440,800 | Hanford et al. | May 4, 1948 |
| 2,602,824 | Padbury et al. | July 8, 1952 |
| 2,626,254 | Miller et al. | Jan. 20, 1953 |
| 2,636,907 | Miller | Apr. 28, 1953 |
| 2,636,908 | Dittman et al. | Apr. 28, 1953 |
| 2,647,110 | Wiseman | July 28, 1953 |
| 2,689,241 | Dittman et al. | Sept. 14, 1954 |
| 2,689,872 | Denison et al. | Sept. 21, 1954 |
| 2,694,701 | Blum et al. | Nov. 16, 1954 |
| 2,700,661 | Miller | Jan. 25, 1955 |
| 2,705,706 | Dittman et al. | Apr. 5, 1955 |
| 2,739,960 | Dittman | Mar. 27, 1956 |

FOREIGN PATENTS

| | | |
|---|---|---|
| 600,145 | Great Britain | Apr. 1, 1948 |